United States Patent
Boelke

(10) Patent No.: US 11,092,101 B2
(45) Date of Patent: Aug. 17, 2021

(54) HEATER IN-CIRCUIT CAPACITIVE MEASUREMENT

(71) Applicant: Rosemount Aerospace Inc., Burnsville, MN (US)

(72) Inventor: Joel Boelke, Eden Prairie, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 63 days.

(21) Appl. No.: 16/108,629

(22) Filed: Aug. 22, 2018

(65) Prior Publication Data

US 2020/0063682 A1 Feb. 27, 2020

(51) Int. Cl.
*F02D 41/14* (2006.01)
*G01N 27/416* (2006.01)

(52) U.S. Cl.
CPC ..... *F02D 41/1494* (2013.01); *F02D 41/1455* (2013.01); *G01N 27/4163* (2013.01)

(58) Field of Classification Search
CPC .. B64D 15/12; G01N 27/228; G01R 27/2605; G01R 27/28; H05B 6/686
See application file for complete search history.

(56) References Cited

U.S. PATENT DOCUMENTS

| | | | | |
|---|---|---|---|---|
| 3,585,623 | A | * | 6/1971 | Laukaitis ............. G01R 31/026 340/640 |
| 5,034,610 | A | | 7/1991 | Spacher et al. |
| 5,347,841 | A | * | 9/1994 | Enzinna ................. G01D 18/00 73/1.88 |
| 5,929,328 | A | | 7/1999 | Seidenfuss |
| 7,223,946 | B2 | | 5/2007 | Schnaibel et al. |
| 10,309,331 | B2 | * | 6/2019 | Hauser .................... F02D 41/20 |
| 2004/0012498 | A1 | | 1/2004 | Peck et al. |
| 2008/0016958 | A1 | * | 1/2008 | Matsumoto ........... G01F 1/6845 73/204.26 |
| 2013/0134149 | A1 | | 5/2013 | Weiss et al. |
| 2017/0299626 | A1 | * | 10/2017 | Dichek ..................... G01F 1/46 |
| 2018/0188302 | A1 | * | 7/2018 | Humphrey ........... G01R 19/165 |
| 2018/0275185 | A1 | * | 9/2018 | Essawy .................. B64D 15/12 |

FOREIGN PATENT DOCUMENTS

| | | |
|---|---|---|
| EP | 3379266 A1 | 9/2018 |
| WO | 2013135280 A1 | 9/2013 |

OTHER PUBLICATIONS

"AC Capacitance and Capacitive Reactance in AC Circuit." Basic Electronics Tutorials, Jun. 14, 2020, www.electronics-tutorials.ws/accircuits/ac-capacitance.html. (Year: 2015).*
Extended European Search Report dated Dec. 12, 2019, received for corresponding European Application No. 19190596.7, 39 pages.

* cited by examiner

*Primary Examiner* — Noam Reisner
(74) *Attorney, Agent, or Firm* — Kinney & Lange, P.A.

(57) ABSTRACT

A system includes a heating element, a signal injector, and a signal receiver. The heating element is coupled between a first node and a second node. The signal injector is communicatively coupled the heating element via the first node. The signal generator is configured to provide a test signal to the heating element. The signal receiver is communicatively coupled to the heating element via the second node. The signal receiver is configured to receive the test signal from the heating element and to determine a capacitance of the heating element based upon the received test signal.

19 Claims, 3 Drawing Sheets

HEATER IN-CIRCUIT CAPACITIVE MEASUREMENT

BACKGROUND

Thermal heating technology is used in sensors and probes externally-mounted to an aircraft to mitigate the effects of rain and icing. Rain and icing can impair the visibility of cameras and light sensors. Icing can lock up angle-of-attack sensors and other moving probes. Heaters prevent buildup of water droplets and ice allowing sensors and probes to operate normally. Loss of, or degraded heater performance can directly impact sensor and probe performance. Loss of heater function can cause loss of aircraft system function and make aircraft unavailable for use. Loss of aircraft system availability can cause significant customer dissatisfaction, flight delays, and revenue loss. To prevent heater failure, predicting future heater failure in aircraft is desirable.

SUMMARY

In one example, a system comprises a heating element, a signal injector, a first signal coupling device, a signal receiver, and a second signal coupling device. The heating element is mounted to an aircraft between a first node and a second node. The heating element is configured to mitigate effects of rain and/or icing. The signal injector is communicatively coupled to the heating element via the first node. The signal generator is configured to provide a test signal to the heating element. The first signal coupling device is configured to communicatively couple the signal injector to the heating element via the first node. The signal receiver is communicatively coupled to the heating element via the second node. The signal receiver is configured to receive the test signal from the heating element via the second node and to determine a capacitance of the heating element based upon the received test signal. The second signal coupling device is configured to communicatively couple the signal receiver to the heating element via the second node.

In one example, a system comprises a heating element, a signal injector, and a signal receiver. The heating element is coupled between a first node and a second node. The signal injector is communicatively coupled the heating element via the first node. The signal generator is configured to provide a test signal the heating element. The signal receiver is communicatively coupled to the heating element via the second node. The signal receiver is configured to receive the test signal from the heating element and to determine a capacitance of the heating element based upon the received test signal.

In one example, a method comprises providing, using a signal injector, a test signal to a heating element of an aircraft via a first node; receiving, using a signal receiver, the test signal from the heating element via a second node; and determining, using the signal receiver, a capacitance of the heating element based upon the received test signal.

DETAILED DESCRIPTION

Apparatus, systems, and associated methods relate to detection of degraded heater performance. Loss of or degraded heater performance directly impacts an aircraft's operation including potential effects such as preventing dispatch or loss of system availability. Using the apparatus, systems, and associated methods herein, capacitance of heaters can be measured during heater use. Test signals are injected into heaters and the outputs analyzed for changes in capacitance. Changes in heater capacitance indicate heater degradation, thereby allowing active monitoring of heaters to predict heater degradation.

Figure 1:
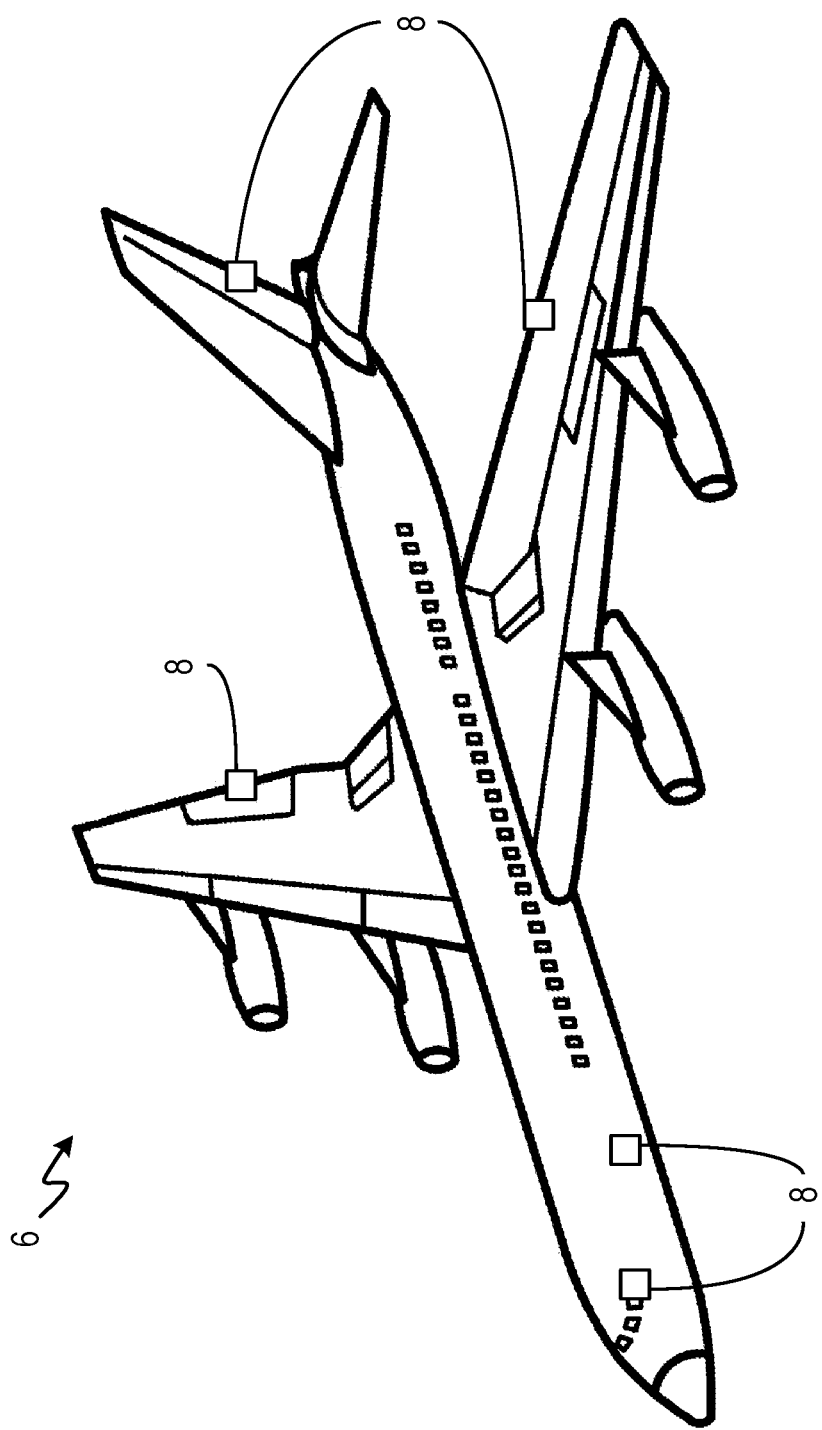
FIG. 1 illustrates an aircraft with multiple heaters.

FIG. 1 illustrates aircraft 6 including heaters 8.

Aircraft 6 uses heaters 8 to prevent build-up of moisture, fogging, and/or icing. Heaters 8 prevent visibility impairment of cameras and light sensors, and prevent lock up of angle-of-attack sensors and other probes. Loss of, or degradation of heater performance can cause loss of aircraft system function and make aircraft unavailable for use.

Figure 2:
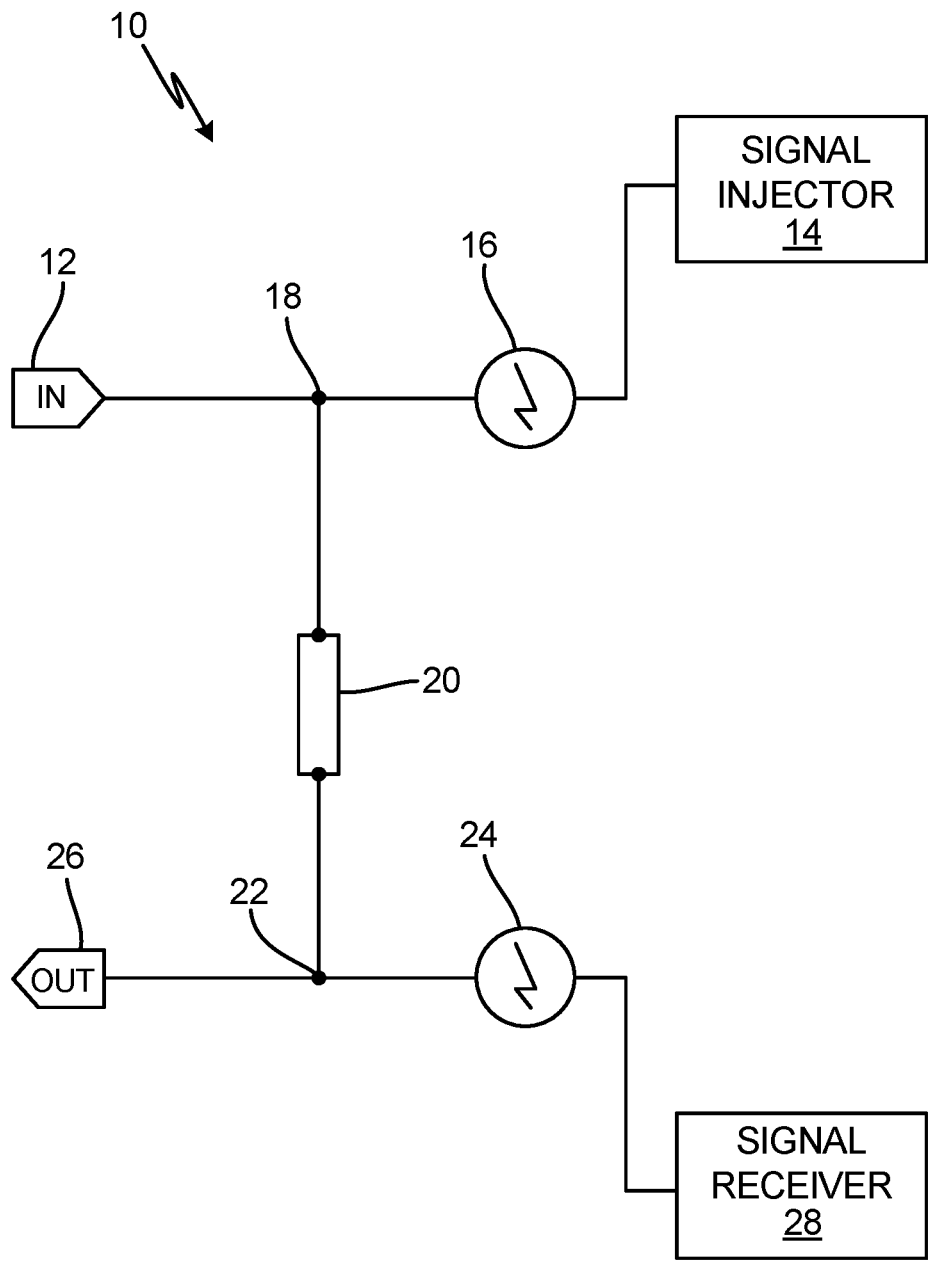
FIG. 2 is a schematic diagram of a heater in-circuit capacitive measurement system.

FIG. 2 illustrates heater capacitive measurement system 10 including power input 12, signal injector 14, signal coupling device 16, node 18, heating element 20, node 22, signal coupling device 24, power output 26, and signal receiver 28.

Power input 12 is electrically coupled to heating element 20 at node 18. Signal injector 14 is communicatively coupled to heating element 20 at node 18 via signal coupling device 16. Power output 26 is electrically coupled to heating element 20 at node 22. Signal receiver 28 is communicatively coupled to heating element 20 at node 22 via signal coupling device 24. In one example, signal coupling devices 16 and 24 are optocouplers.

Power input 12 provides power to heating element 20. Heating element 20 is configured to provide heat to a region of an aircraft. Signal injector 14 is configured to provide a test signal to heating element 20. Signal injector 14 can be a signal generator, a processor, or other device capable of providing a test signal. The test signal provided by signal injector 14 can have a predetermined frequency or a frequency sweep. Signal receiver 28 receives the test signal provided by signal injector 14 after it passes through heating element 20.

The test signal provided by signal injector 14 will undergo amplitude and phase shifts as it passes through heating element 20. Therefore, the provided test signal and the received test signal will be different. The amplitude and phase shift depend on the capacitance of heating element 20. A given capacitance provides a given impedance at a given frequency. In one example, the capacitance of heating element 20 can be determined based upon the amplitude and phase shift of the test signal as received by signal receiver 28. In another example, the capacitance of heating element 20 can be determined based upon changes in the rise and fall time characteristics of received signals over time. An fast Fourier transfer can be performed on received signals to determine the frequency content of the received signals. A change in the frequency content from one received signal to another can correlate to a change in capacitance of heating element 20. Signal receiver 28 can be a processor or other device capable of analyzing the received test signal.

Figure 3:
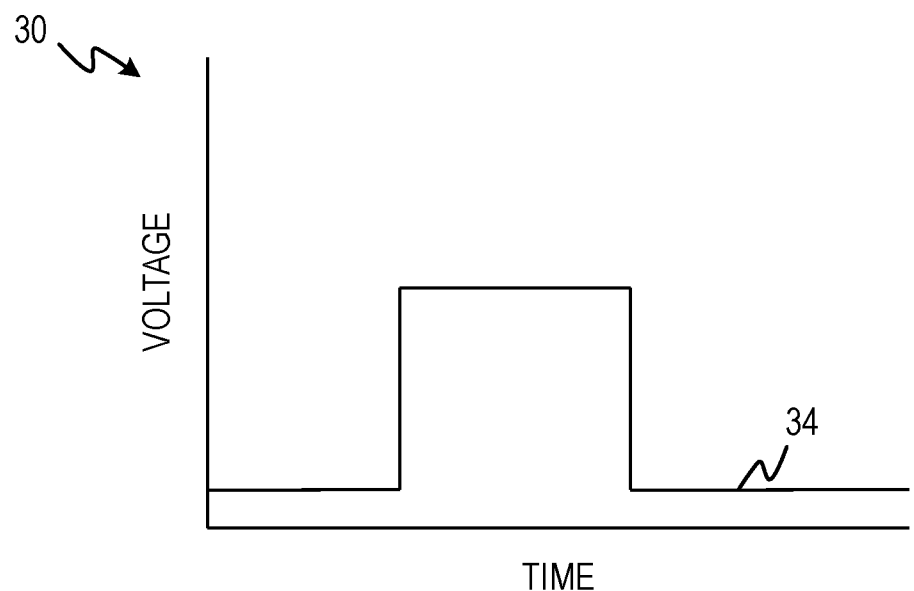
FIG. 3 is a graphical representation of an example input signal and a corresponding output signal of a probe heater in-circuit capacitive measurement system.
Figure 3:
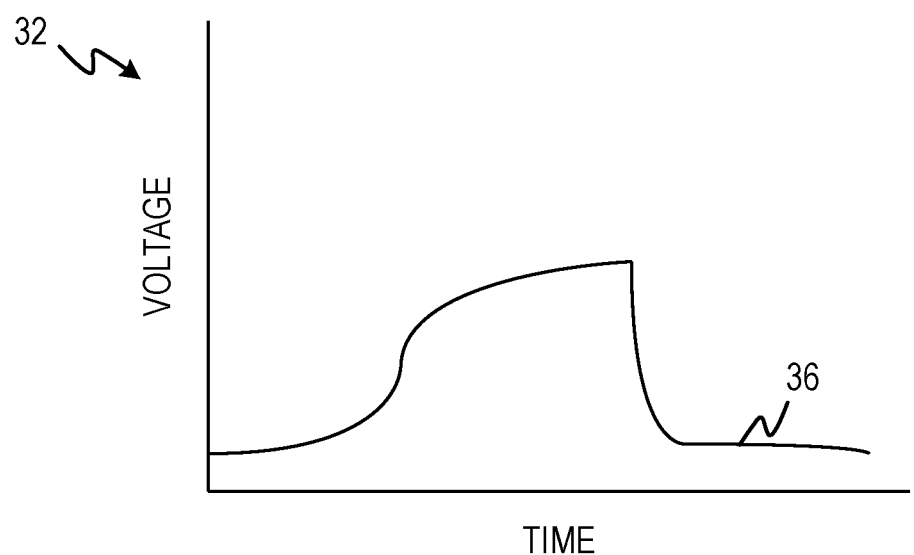

FIG. 3A is a graphical representation of an example input signal and, FIG. 3B is a graphical representation of a corresponding output signal of a probe heater in-circuit capacitive measurement system including graph 30 (FIG. 3A) and graph 32 (FIG. 3B). Graph 30 includes input signal 34. Graph 32 includes output signal 36.

Input signal 34 and output signal 36 are depicted as voltages over time. Input signal 34 is a waveform of a signal turning on and off. The rise and fall time of input signal 34 is instantaneous (or nearly instantaneous). Output signal 36 demonstrates a non-ideal signal characteristic that includes capacitance in the transmission path. Capacitance in the transmission path results in output signal 36 having a rounded signal transition edge and damped settling. The capacitance of the transmission line is defined by aspects such as material, physical dimension, signal routing, and proximity to other conductive materials. Changes in the output signal due to capacitance can be monitored and measured by capacitive measurement systems such as heater capacitive measurement system 10 of FIG. 2. This allows the monitoring of heater health during heater operation.

Accordingly, apparatus, systems, and associated methods herein, allow aircraft heater systems to be monitored during heater use to predict heater degradation. Utilizing the heater in-circuit measurement system described herein allows the monitoring of heaters during heater use. This allows heater degradation to be predicted in flight rather than only when heaters are offline.

Discussion of Possible Embodiments

The following are non-exclusive descriptions of possible embodiments of the present invention.

A system can comprise a heating element mounted to an aircraft between a first node and a second node, the heating element configured to mitigate effects of rain and/or icing; a signal injector communicatively coupled to the heating element via the first node, the signal generator configured to provide a test signal to the heating element; a first signal coupling device configured to communicatively couple the signal injector to the first node; a signal receiver communicatively coupled to the heating element via the second node, the signal receiver configured to receive the test signal from the heating element and to determine a capacitance of the heating element based upon the received test signal; and a second signal coupling device configured to communicatively couple the signal receiver the heating element via the second node.

The system of the preceding paragraph can optionally include, additionally and/or alternatively, any one or more of the following features, configurations and/or additional components:

A further embodiment of the foregoing system, wherein the first and second signal coupling devices can be optocouplers.

A further embodiment of the foregoing system, wherein the test signal can be a frequency sweep and the capacitance is further determined based upon a difference in amplitude between the provided test signal and the received test signal.

A further embodiment of the foregoing system, wherein the signal receiver can be further configured to determine the capacitance based upon a difference between the provided test signal and the received test signal.

A further embodiment of the foregoing system, wherein the signal injector can be a signal generator.

A further embodiment of the foregoing system, wherein the test signal can have a predetermined frequency and the capacitance can be further determined based upon a phase shift and a frequency shift between the provided test signal and the received test signal.

A further embodiment of the foregoing system, wherein the signal injector and the signal receiver can be a processor.

A system can comprise a heating element of an aircraft coupled between a first node and a second node; a signal injector communicatively coupled to the heating element via the first node, the signal generator configured to provide a test signal to the heating element; and a signal receiver communicatively coupled to the heating element via the second node, the signal receiver configured to receive the test signal from the heating element and to determine a capacitance of the heating element based upon the received test signal.

The system of the preceding paragraph can optionally include, additionally and/or alternatively, any one or more of the following features, configurations and/or additional components:

A further embodiment of the foregoing system, can further comprise a first signal coupling device configured to communicatively couple the signal injector to the heating element via the first node; and a second signal coupling device configured to communicatively couple the signal receiver to the heating element via the second node.

A further embodiment of the foregoing system, wherein the first and second signal coupling devices can be optocouplers.

A further embodiment of the foregoing system, wherein the test signal can be a frequency sweep and the capacitance can be further determined based upon a difference in amplitude between the provided test signal and the received test signal.

A further embodiment of the foregoing system, wherein the signal receiver can be further configured to determine the capacitance based upon a difference between the provided test signal and the received test signal.

A further embodiment of the foregoing system, wherein the signal injector can be a signal generator.

A further embodiment of the foregoing system, wherein the test signal can have a predetermined frequency and the capacitance can be further determined based upon a phase shift and a frequency shift between the provided test signal and the received test signal.

A further embodiment of the foregoing system, wherein the signal injector and the signal receiver can be a processor.

A method can comprise providing, using a signal injector, a test signal to a heating element of an aircraft via a first node; receiving, using a signal receiver, the test signal from the heating element via a second node; and determining, using the signal receiver, a capacitance of the heating element based upon the received test signal.

The method of the preceding paragraph can optionally include, additionally and/or alternatively, any one or more of the following features, configurations and/or additional components:

A further embodiment of the foregoing method, wherein providing the test signal can further include providing the test signal having a predetermined frequency; and determining the capacitance can be further based upon a phase shift and a frequency shift between the provided test signal and the received test signal.

A further embodiment of the foregoing method, wherein providing the test signal can further include providing a frequency sweep signal; and determining the capacitance can be further based upon a change in amplitude between the provided test signal and the received test signal.

A further embodiment of the foregoing method, can further comprise determining, using the signal receiver, a frequency content of the received test signal; and determining, using the signal receiver, a capacitance change of the heating element based upon the frequency content of the received test signal.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for monitoring a health of a heating element mounted to an aircraft between a first node and a second node, the heating element configured to mitigate effects of rain and/or icing, the system comprising:
   a signal injector communicatively coupled to the heating element via the first node, the signal injector configured to provide a test signal to the heating element;
   a first signal coupling device configured to communicatively couple the signal injector to the first node;
   a signal receiver communicatively coupled to the heating element via the second node, the signal receiver configured to:
      receive the test signal from the heating element; and
      determine the health of the heating element based on a comparison of the frequency content of the received test signal to a baseline frequency content; and
   a second signal coupling device configured to communicatively couple the signal receiver to the heating element via the second node.

2. The system of claim 1, wherein the first and second signal coupling devices are optocouplers.

3. The system of claim 1, wherein the test signal is a frequency sweep and the frequency content of the received test signal is further determined based upon a difference in amplitude between the provided test signal and the received test signal.

4. The system of claim 1, wherein the signal receiver is further configured to determine the frequency content of the received test signal based upon a difference between the provided test signal and the received test signal.

5. The system of claim 1, wherein the signal injector is a signal generator.

6. The system of claim 1, wherein:
   the test signal has a predetermined frequency; and
   the frequency content of the received test signal is further determined based upon a phase shift and a frequency shift between the provided test signal and the received test signal.

7. The system of claim 1, wherein:
   the signal injector is a processor; and
   the signal receiver is a processor.

8. A system for monitoring a health of a heating element of an aircraft coupled between a first node and a second node, the system comprising:
   a signal injector communicatively coupled to the heating element via the first node, the signal generator configured to provide a test signal to the heating element; and
   a signal receiver communicatively coupled to the heating element via the second node, the signal receiver configured to:
      receive the test signal from the heating element; and
      determine the health of the heating element based on a comparison of the frequency content of the received test signal to a baseline frequency content.

9. The system of claim 8, further comprising:
   a first signal coupling device configured to communicatively couple the signal injector to the heating element via the first node; and
   a second signal coupling device configured to communicatively couple the signal receiver to the heating element via the second node.

10. The system of claim 9, wherein the first and second signal coupling devices are optocouplers.

11. The system of claim 8, wherein:
    the test signal is a frequency sweep; and
    the frequency content of the received test signal is further determined based upon a difference in amplitude between the provided test signal and the received test signal.

12. The system of claim 8, wherein the signal receiver is further configured to determine the frequency content of the received test signal based upon a difference between the provided test signal and the received test signal.

13. The system of claim 8, wherein the signal injector is a signal generator.

14. The system of claim 8, wherein:
    the test signal has a predetermined frequency; and
    the frequency content of the received test signal is further determined based upon a phase shift and a frequency shift between the provided test signal and the received test signal.

15. The system of claim 8, wherein:
    the signal injector is a processor; and
    the signal receiver is a processor.

16. A method of monitoring a health of a heating element of an aircraft coupled between a first node and a second node, the method comprising:
    providing, using a signal injector, a test signal to the heating element via a first node;
    receiving, using a signal receiver, the test signal from the heating element via a second node; and
    determining, using the signal receiver, the health of the heating element by:
       evaluating a frequency content of the received test signal; and
       comparing the frequency content of the received test signal to a baseline frequency content.

17. The method of claim 16, wherein:
    providing the test signal further includes providing the test signal having a predetermined frequency; and
    evaluating the frequency content of the received test signal comprises evaluating a phase shift and a frequency shift between the provided test signal and the received test signal.

18. The method of claim 16, wherein:
    providing the test signal further comprises providing a frequency sweep signal; and
    evaluating the frequency content of the received test signal comprises evaluating a change in amplitude between the provided test signal and the received test signal.

19. The method of claim 16, further comprising:
    determining, using the signal receiver, a frequency content of the received test signal; and
    determining, using the signal receiver, the health of the heating element based upon the comparison of the frequency content of the received test signal to the baseline frequency content.

\* \* \* \* \*